Dec. 4, 1962 E. J. JOHNSTON 3,066,470
RAKE TOOTH MOUNTING
Filed Dec. 30, 1960

INVENTOR
Edward J. Johnston
Paul O. Pippel
ATTORNEY

United States Patent Office 3,066,470
Patented Dec. 4, 1962

3,066,470
RAKE TOOTH MOUNTING
Edward J. Johnston, La Grange Park, Ill., assignor to International Harvester Company, Chicago, Ill., a corporation of New Jersey
Filed Dec. 30, 1960, Ser. No. 79,596
3 Claims. (Cl. 56—400)

This invention relates to rake tooth means, particularly for side delivery rakes or equivalent implement such as a hay or forage crop pickup means.

A general object of the invention is to provide an improved rake tooth means and mounting therefor.

More particularly, the invention features the utilization of mounting means including a block of rubber or similar elastomer material with mounting means so constructed and arranged so as to hold the tooth in a selected position on a tine bar and such as will prevent the tine from being loosened and caused to wander off its position by the application of working loads to the tooth.

It is a specific object of the invention to provide an improved mounting means in the form of a block of rubber having a pair of furcations embracing a rake bar therebetween and wherein the rubber block comprises a means projecting into the tine bar for holding the entire assembly against axial as well as circumferential displacement with respect to the tubular tine bar upon which the assembly is mounted.

Figure 2:
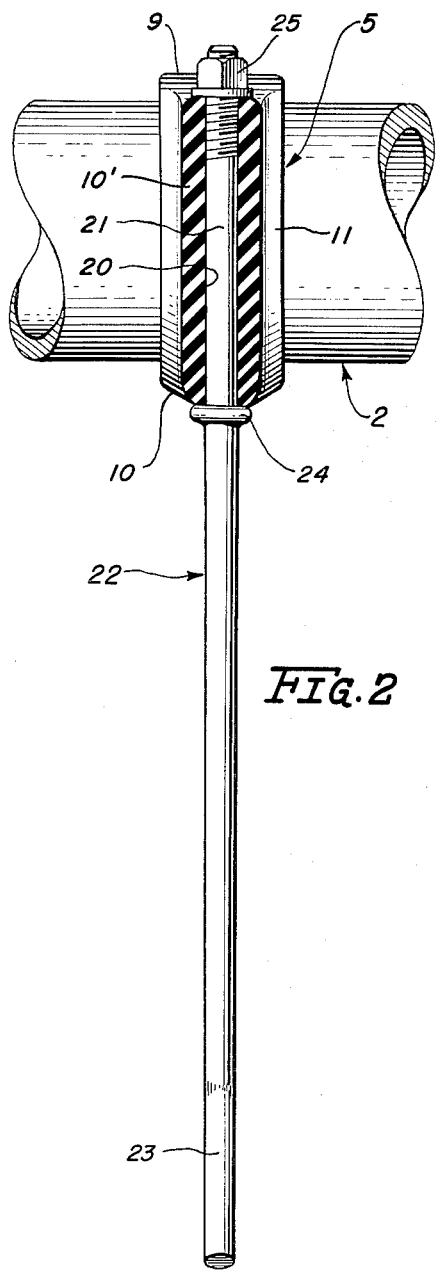
Figure 1:
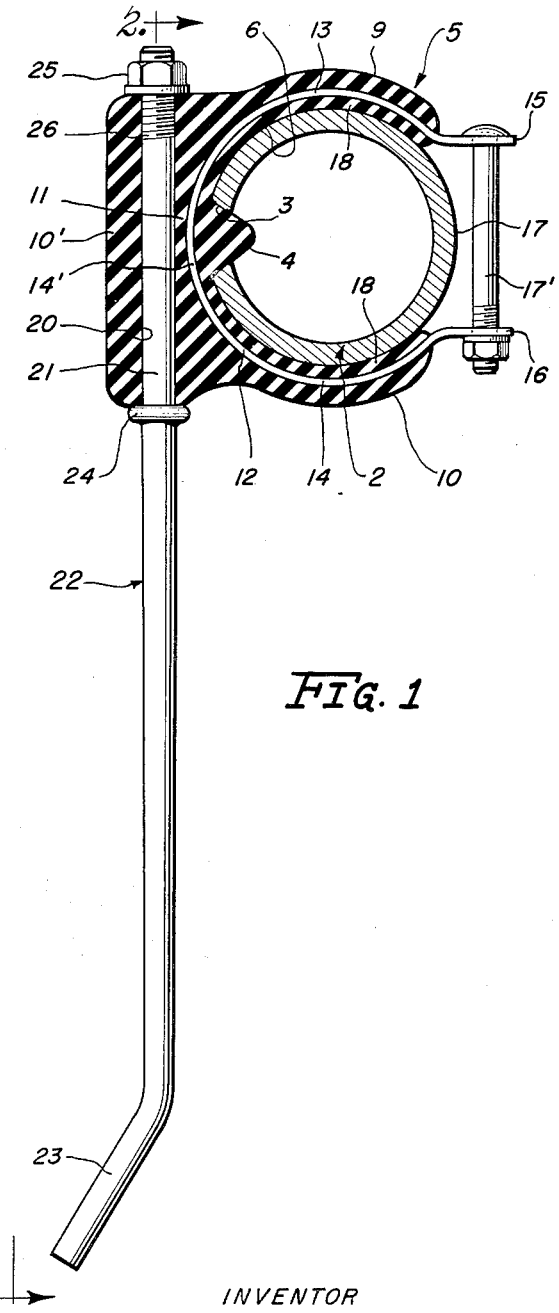

These and other objects and advantages inherent in and encompassed by the invention will become more readily apparent from the specification and the drawings wherein:

FIGURE 1 is a side-elevational view partially in vertical section of the tooth bar and novel mounting means therefor; and FIGURE 2 is a transverse vertical sectional view taken substantially on the line 2—2 of FIGURE 1.

FIGURES 1 and 2 illustrate a tubular tine bar of cylindrical section, generally designated 2, which is provided with a substantially horizontal radial opening 3 of inwardly tapered configuration receiving a similarly tapered rubber or elastomer lug or stud 4 of a tine bar mounting assembly generally designated 5.

The assembly 5 provides a pocket 6 which has a configuration similar to the bar 2 and is developed by upper and lower furcations 9 and 10 which extend respectively over and under the bar, the furcations 9 and 10 merging into the body portion 10' which is a substantially rectangular block of elastomer material, the back side of the body portion providing a bight 11 which interconnects with the top and bottom furcations 9 and 10 or legs. It will be observed that there is embedded in the top and bottom furcations, as well as the bight portion, a metallic C-clamp 12 which comprises top and bottom sections 13 and 14 and a bight portion 14', respectively, mounted within the top and bottom legs and the bight portion 11, the legs 12 and 13 having rearwardly projecting end portions 15 and 16 which extend beyond the rear section 17 of the bar and admit a securing means in the form of vertical bolt and nut assembly 17' therethrough by means of which the C-clamp is tightened about the bar deforming the intervening portion 18 of the elastomer material against the bar.

It will be readily realized that since the bar is provided only with one hole, as against transverse or diametrical openings, that the strength of the bar is materially preserved and at the same time the lug which enters into the front opening in the bar serves to position and hold the tooth from being displaced.

The block or body portion 10 of the mounting assembly comprises a vertical opening 20 which admits the root end portion 21 of the tine 22 which has a lower operating end 23. The tine is retained within the bar by means of a shoulder 24 which is at the lower end of the root portion and a nut 25 which is threaded on the upper end 26 of the root end portion of the tine, the shoulder and nut embracing the body portion therebetween.

It will be observed that the tine bar 2 serves as a fulcrum for the tooth as the tooth flexes back and forth under working conditions and tightening and loosening of the nut changes the flexibility of the block.

What is claimed is:

1. Rake tooth means for mounting on a rake bar, comprising: a mounting assembly including a block of elastomer material having a pair of furcations projecting from one side thereof, said furcations providing with said block a concave pocket adapted to receive the rake bar with the furcations at the top and bottom sides of the bar, said furcations projecting behind the bar and having end portions thereat, a metallic clamp element shaped to conform to the pocket and embedded in said material and spaced radially outwardly of the bar and having end portions projecting behind the bar, securing means projecting through said end portions and drawing the same together with a hoop tension tightly engaging the clamp with the mounting means against the bar, a generally horizontal stud of elastomer material projecting from the body portion of the block into said pocket into a complementary opening in said bar, said block having a substantially vertical opening, and a depending tooth having an upper end portion releasably secured to said block through said opening therein.

2. Rake tooth means for mounting on a rake bar, comprising: a mounting block of elastomer material having a portion proximate to the bar and another portion spaced from the bar, said first-mentioned portion having a concavity generally conforming to the proximate portion of the bar, a rake tine of relatively rigid material secured to the block and protecting from said other portion of the block transversely of the bar, and U-shaped means at said first end of the block and including a bight connected to said first portion, and a pair of legs projecting beyond said first portion at opposite sides of the cavity so as to straddle the rake bar, and a positioning lug of elastomer material on said first portion projecting into an opening in the bar in interlocking relation therewith said lug being between said U-shaped means and the rake bar and being compressible by the U-shaped means against the bar.

3. In a rake tooth mounting, a combination of a block of elastomer material having a rear portion providing a bar-receiving cavity and a front substantially vertically elongated body portion having means for securement to an associated tine, said block having a positioning lug of elastomer extending from the body portion into the cavity for entry into an opening in an associated tine bar.

References Cited in the file of this patent
UNITED STATES PATENTS

| | | |
|---|---|---|
| 2,328,121 | Bartek | Aug. 31, 1943 |
| 2,909,889 | Gustafson | Oct. 27, 1959 |
| 2,989,835 | Johnston | June 27, 1961 |

FOREIGN PATENTS

| | | |
|---|---|---|
| 1,193,150 | France | Apr. 27, 1959 |